O. F. FITCH.
Wheel-Cultivator.
No. 28,843.  Patented June 26, 1860.
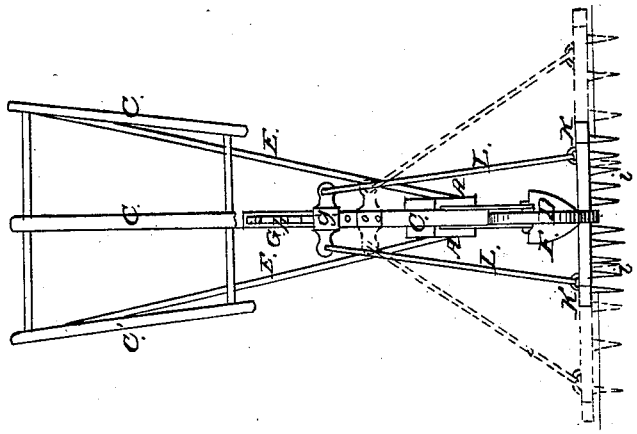
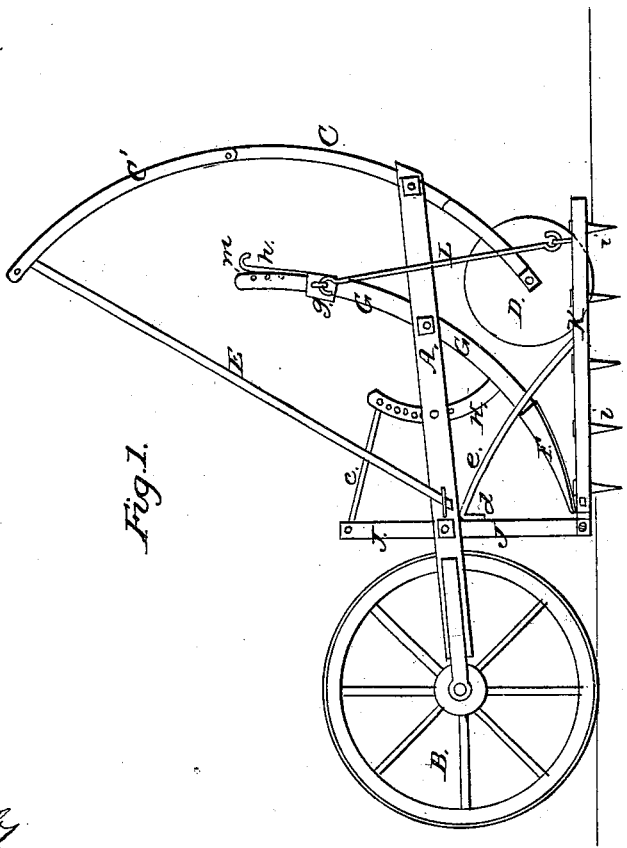
WITNESSES:
J. W. Coomly
A. S. Spencer
INVENTOR:
O. F. Fitch
per Munn & Co.
att'ys

UNITED STATES PATENT OFFICE.

O. F. FITCH, OF MORRISTOWN, INDIANA.

IMPROVEMENT IN CULTIVATORS.

Specification forming part of Letters Patent No. 28,843, dated June 26, 1860.

*To all whom it may concern:*

Be it known that I, O. F. FITCH, of Morristown, in the county of Shelby and State of Indiana, have invented a new and useful Plow with Harrow Attachment; and I do hereby declare that the following is a full, clear, and exact description thereof, reference being had to the accompanying drawings, making a part of this specification, in which—

Figure 1 represents a side elevation of the combined plow and harrow. Fig. 2 shows a rear view of the same with the harrow-wings distended and contracted.

Similar letters of reference indicate corresponding parts in both figures.

The object of this invention is to construct a hand-plow for light plowing only, and to construct it in such a way that a harrow may be conveniently combined with it, which will be supported, braced, and strengthened by the plow, and capable of being extended or contracted according to circumstances. The whole is to be constructed in such a way that they will be intimately connected with each other, and so that the plow may be used without the harrow, but not the harrow without the plow.

The machine will be used for the cultivation of crops, the plow to open the land and divest it of weeds and roots, and for thinning out young plants, and then the harrow to clear the surface, stir and mellow it, and harrow or level down the soil, so that the plow will move easier at the next plowing.

To effect these objects my invention consists in combining a large and small wheel with the plow-beam that is made of two bars, and with this beam curved handles that serve both in plowing and harrowing, while one wheel only is used in harrowing, and in applying such a plow-stock and sector-brace for adjusting the plow and bracing it to the beam that they will serve an important object in attaching the harrow to the plow, bracing it, and assisting in the extension and contraction of the harrow-wings, all as will be hereinafter described and represented, making a very cheap and convenient machine for the cultivation of drill-husbandry.

To enable those skilled in the art to fully understand my invention, I will proceed to describe its construction and operation.

In the drawings, A A represent two light but strong timbers that form the beam of the plow. To the front end of this beam that is strongly bolted together is the steering-wheel B, which is quite a large wheel. This wheel has its axle-bearings in two arms that project out from the beam, and to the rear end of the beam is attached a curved rod, C, projecting above and below the beam, and curving toward its forward end. To the lowermost end of this curved rod C the rear wheel, D, is attached, that runs on the ground in the furrow made by the plow, and in the track of the large front wheel, B, when the harrow is not attached. The upper part of rod C carries the two curved handles C' C', that are used to push and guide the plow over the field. E E are two brace-rods that are attached to the top of each handle C', and to the forward end of the beam.

In front of the rod C is attached to the beam the plow-stock or standard G, carrying the shovel-plow F, as shown clearly in Fig. 1. This stock is curved forward and is braced by a perforated sector-piece, H, through which passes a bolt, and by removing this bolt the plow may be adjusted to work any desirable depth in the earth. The upper part of the plow-stock is perforated, as shown by dotted lines in Fig. 1. This completes the plow, which is moved about and guided by manual labor, the person taking hold of the handles C' C'. The harrow is now attached in the following manner.

J is an upright post that is bolted between the two timbers forming the beam and braced by a rod, c, that extends from its upper end back to the sector H, and two rods, e e, that are jointed to it at a, and connect with the harrow-wings near their rear ends, as represented in the drawings. The bottom of this post J is in a line with the tread of the wheel, and to it is hinged the two harrow-wings K K, carrying the teeth i i, which frames or wings are braced and adjusted or extended laterally by the jointed brace-rods L L, that connect with each wing near its rear end, and with the upper part of plow-stock G. These rods L L connect with a sliding tube, g, that is on this stock, which, when moved up or down, extends or contracts the harrow, as shown in Fig. 2 by the red and black lines, respectively. h is a spring-plate with a curved handle-piece, a. This plate carries a pin, n, that serves to fix the tube g, and consequently the harrow-wings, at any desirable point to which they may be set by placing the pin in one of the holes in the head of the stock. The machine may now be used for a harrow.

To use the machine again as a plow it is only necessary to detach the parts that brace and secure the harrow, which operation may be accomplished in a very short time.

Having thus described my invention, what I claim as new, and desire to secure by Letters Patent, is—

The within-described combination and arrangement of braces and frames, arranged in the relations herein set forth, and made to serve the purposes described.

O. F. FITCH.

Witnesses:
W. W. WOODYARD,
I. G. SPURRIER.